(12) United States Patent
Papageorge

(10) Patent No.: US 7,727,465 B2
(45) Date of Patent: Jun. 1, 2010

(54) SYSTEM AND METHOD FOR PRODUCING MASSIVE AMOUNTS OF ELEMENTAL IODINE

(76) Inventor: Spyros J. Papageorge, 12445 Old Still Ct., Ponte Vedra, FL (US) 32082

(*) Notice: Subject to any disclaimer, the term of this patent is extended or adjusted under 35 U.S.C. 154(b) by 0 days.

(21) Appl. No.: 12/109,900

(22) Filed: Apr. 25, 2008

(65) Prior Publication Data
US 2008/0217260 A1 Sep. 11, 2008

Related U.S. Application Data

(62) Division of application No. 11/278,741, filed on Apr. 5, 2006, now Pat. No. 7,445,759.

(51) Int. Cl.
| | |
|---|---|
| A61L 9/00 | (2006.01) |
| B01D 11/02 | (2006.01) |
| B01D 15/00 | (2006.01) |
| E03D 9/03 | (2006.01) |
| E03D 9/02 | (2006.01) |
| F16L 5/00 | (2006.01) |
| B67B 7/00 | (2006.01) |
| B67D 5/56 | (2006.01) |
| B67D 3/00 | (2006.01) |
| A24F 15/04 | (2006.01) |
| B65H 1/00 | (2006.01) |
| B08B 7/00 | (2006.01) |

(52) U.S. Cl. .......... 422/37; 422/261; 422/263; 422/264; 422/265; 422/274; 422/275; 422/276; 422/282; 422/255; 422/28; 422/32; 137/571; 137/572; 137/575; 137/205.5; 137/357; 137/587; 137/592; 137/268; 222/1; 222/129; 222/173; 222/190; 222/478; 222/526; 222/544; 221/68; 221/92; 221/186; 221/197; 221/282; 221/287; 221/303; 4/222; 4/229; 4/230; 4/261; 210/198.1; 210/753; 210/754; 210/755; 210/756; 210/749; 210/542; 134/6; 134/26; 134/42; 134/61; 134/93

(58) Field of Classification Search .......... 422/261, 422/263–265, 274–276, 282, 37, 255, 28, 422/32; 137/571–572, 575, 205.5, 357, 587, 137/592, 268; 222/1, 129, 173, 190, 478, 222/526, 544; 221/68, 92, 186, 197, 282, 221/287, 303; 4/222, 229–230, 261; 210/198.1, 210/753–756, 749, 542; 134/6, 26, 42, 61, 134/93

See application file for complete search history.

(56) References Cited

U.S. PATENT DOCUMENTS

| 1,056,780 | A | | 3/1913 | Deacon et al. |
|---|---|---|---|---|
| 2,219,763 | A | | 10/1940 | Cartier et al. |
| 2,362,607 | A | * | 11/1944 | Albertson .......... 137/99.5 |
| 5,919,374 | A | * | 7/1999 | Harvey et al. .......... 210/753 |

* cited by examiner

Primary Examiner—Jill Warden
Assistant Examiner—Monzer R. Chorbaji
(74) Attorney, Agent, or Firm—Daniel S. Polley, P.A.

(57) ABSTRACT

A system and method for extracting active elemental iodine from the contact of water with stored crystal iodine and for introducing the extracted elemental iodine into a water supply line and/or otherwise making the extracted elemental iodine available for an intended use. The system operates by allowing a portion of the water entering from a water supply line to be redirected to a first housing where it makes contact with stored crystal iodine causing to extract active elemental iodine. The iodinized water leaves the first housing and enters a second housing where it makes contact additional stored crystal iodine to help stabilize the elemental iodine concentration. The system can be designed to provide the elemental iodine in more than one potency concentration through the use of a metering valve and different travel routes for the elemental iodine out of the second housing.

14 Claims, 1 Drawing Sheet

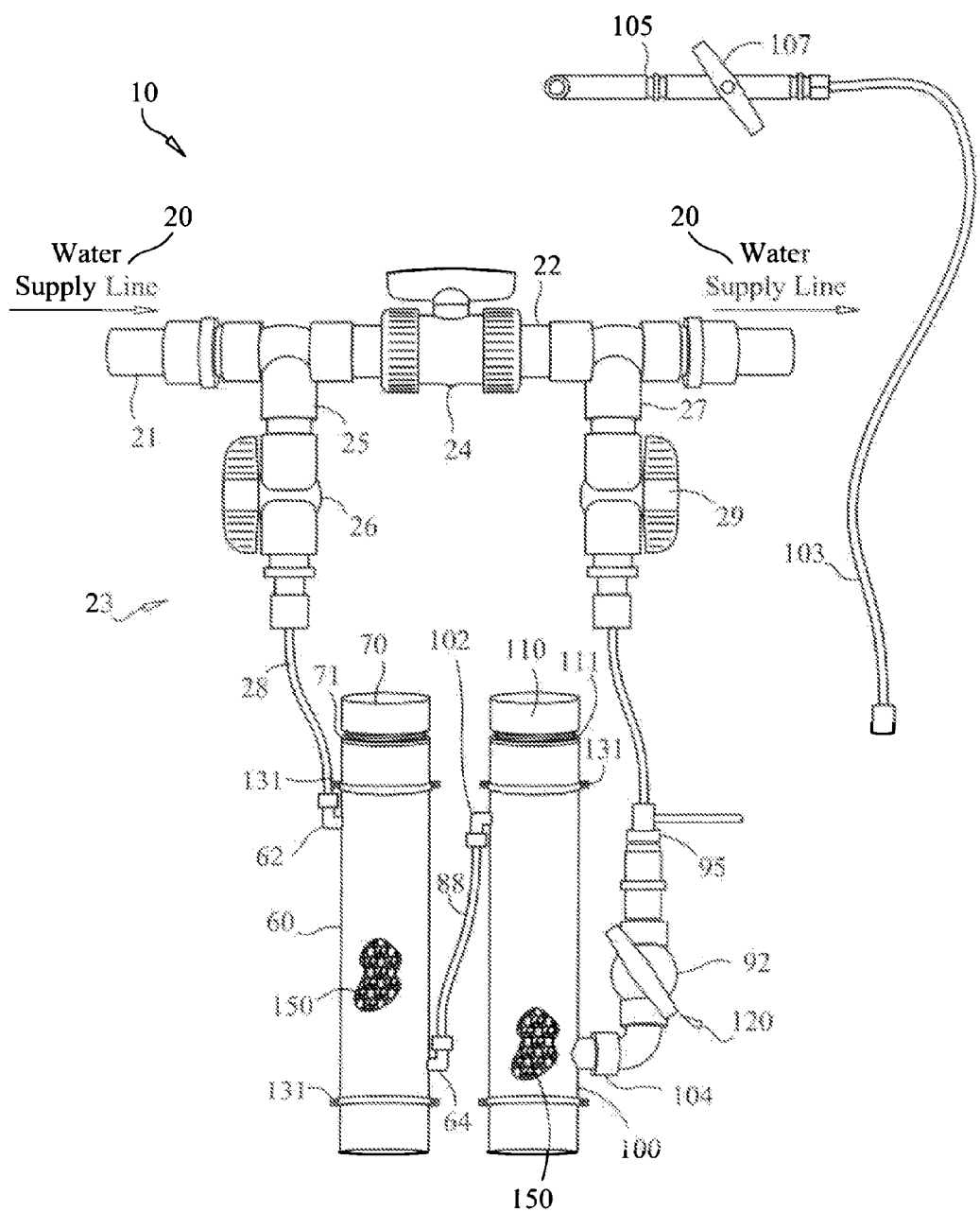

SYSTEM AND METHOD FOR PRODUCING MASSIVE AMOUNTS OF ELEMENTAL IODINE

This application is a Divisional Application of U.S. application Ser. No. 11/278,741, filed Apr. 5, 2006, which is incorporated herein by reference.

1. FIELD OF THE INVENTION

The present invention relates generally to iodine production, in particular to a system and method for producing elemental iodine.

2. BACKGROUND OF THE INVENTION

Diseases, such as, but not limited to, salmonella, often are found in chickens and poultry, such as those found on a chicken farm. Additionally, bacteria, such as, but not limited to, e coli, has also been found on farms. Thus, there is a need to eliminate or reduce these and other diseases and bacteria from farms and other locations. The present invention is directed to addressing this problem and also helps to purify drinking water systems and other system and provides a system and method for generating or extracting active elemental iodine and introducing the elemental iodine back into a drinking water system. The use of the elemental iodine generated by the present invention method and system may also be beneficial for treating medical problems and for other uses.

3. SUMMARY OF INVENTION

The present invention relates generally to a method and system for the storage of crystal iodine where it is use the system to create elemental iodine. The extracted elemental iodine can be used for different medical needs, such as but not limited to, treating wounds, protecting the thyroid glands from radioactive iodine exposure, disinfecting water supplies, etc. The extracted elemental iodine is provided in an active elemental iodine form and not iodides. Iodine is derived from a family of halogens which include the following members, Fluorine, Chlorine, Bromine, Iodine, and Astatine. From this group elemental iodine is the only one known to have the ability to disinfect or cure many diseases, and can be used to protect the thyroid gland from exposure to harmful elements. The system does not require the use of electricity or complex mechanical elements in order to produce the active elemental iodine.

Generally, the present invention system and method permits a constant flow and extraction of elemental iodine through the contact of flowing water with the stored crystal iodine. In a preferred but non-limiting embodiment, the system can include two housings (i.e. PVC, stainless steel, etc.) which can be tube shaped and can be approximately 1 inch to approximately 6 inches or more in diameter. Though also not limiting, the walls of the housing can be approximately ¼ inch thick. The housings are preferably connected in series with the first housing serving as a primary unit and the second housing serving as a secondary unit. The housings can each be provided with a removable cap and are filed with crystal iodine, which can be approximately 98% pure. The housings can be mounted or secured to a platform for easy handling.

The system operates by allowing a portion of the water entering from a water supply line to be back flowed or back pressured, through the partial opening of a gate valve in the water supply line, where the back flowed water is redirected through a water entry line to the first housing. The back flowed water enters the first housing and contacts the stored crystal iodine causing the water to get iodinized (creating or extracting active elemental iodine). The iodinized water leaves the first housing and enters the second housing where it contacts the crystal iodine stored therein which helps to stabilize the elemental iodine concentration. The extracted elemental iodine can be used for many purposes, some of which have been mentioned above. However, the desired potency of the elemental iodine can be different from one use to another. Thus, the system can be designed to provide the elemental iodine in more than one potency concentration through the use of control and/or metering valves and different travel routes for the elemental iodine out of the secondary housing. One travel route can include a water reentry line for introducing the extracted elemental iodine into the water supply line. Another travel route provides a hose where the extracted elemental iodine can be directly applied and most likely in a more potent form as compared to reentry into the water supply line where the concentration of the elemental iodine is diluted.

It is an object of the present invention to provide a system and method for extracting active elemental iodine from the contact of water with stored crystal iodine and for introducing the extracted elemental iodine into a water supply line and/or otherwise making the extracted elemental iodine available for an intended use.

4. BRIEF DESCRIPTION OF THE DRAWINGS

The FIGURE illustrates the present invention system for creating active elemental iodine which is either directed back into the water supply line or through a separate fluid line where it can be available in a more potent form.

5. DETAILED DESCRIPTION OF THE PREFERRED EMBODIMENT

As seen in the FIGURE the present invention provides a system and method for creating active elemental iodine and is generally referenced as system 10. System 10 redirects water from a water supply line 20 through one or more housings containing crystal iodine which forms elemental iodine upon contact with water. Water supply line 20 can be any type of water source, such as, but not limited to a main water line from water plant, a garden hose (wherein threads on inlet 21 could be provided for connecting the garden hose to system 10), etc.

The formed or generated elemental iodine (iodinized or iodinated water) can be mixed back into the water supply line to dilute the elemental iodine or the created elemental iodine can be directly administered, such as, but not limited to, through an outlet hose, where it can be provided in a more potent or higher concentration form. As mentioned above, system 10 can be installed within a water plant supply line, connected to a garden hose, etc. Where installed within a water supply line, system 10 can merely create a break in the flow of at least a portion of the water from through water supply line 20 for use in creating elemental iodine through contact with crystal iodine.

A water supply inlet 21 of system 10 can be in communication with water supply line 20. Depending on the position of a valve 24 (i.e. gate valve, etc.), water entering inlet 21 from water supply line 20 can either travel through non-mixing water route or pipe line 22 and/or mixing water route or pipe line 23. Where mixing is not desired, valve 24 is opened and valve 26 is closed causing water to travel through non-mixing water route 22 and to ultimately continue through water supply line 20 unchanged as if the present invention system 10 was not present.

Where the creation of elemental iodine is desired, valve 26 is opened and valve 24 can be partially, but not fully, opened. The partial opening of valve 24 creates back pressure and causes a first portion of the water entering inlet 22 to continue through and out of water line 22 unchanged, while also creating a backflow at valve 24 to direct a remaining portion of the water through water exit line 25 and valve 26 and into tubing 28 to serve as an inlet line into a first cylinder or canister 60 containing or housing an amount of crystal iodine 150.

Water exit line 25 is disposed before the point of location for valve 24 in water supply line 22 and an iodinized water (having a level of active elemental iodine in parts per million) reentry line 27 is disposed at a point of location beyond valve 24 in water supply line 20.

First cylinder, canister, receptacle, vessel, housing, container, etc. (collectively referred as "Cylinder 60") is provided with a water inlet port having a tubing connection mechanism 62 provided towards the top of first cylinder 60 wherein one end of tubing 28 is attached. First cylinder 60 is also provided with an outlet port having a tubing connection mechanism 64 provided towards the bottom of the first cylinder 60 for exiting the created elemental iodine (as discussed below) out of first cylinder 60. Disposed within first cylinder 60 is a substantial amount of crystal iodine 150 which extends from at or near the bottom of first cylinder 60 up until it is at or near the top of first cylinder 60.

First cylinder 60 can be provided with a removable cap 70 (i.e. threaded and screwed to first cylinder 60, snugly secured to first cylinder 60, etc.) which is sealed through an o-ring 71, gasket, etc. Removable cap 70 permits access to the interior area of first cylinder 60 for adding a fresh supply or additional crystal iodine 150. The amount of crystal iodine 150 contained within first cylinder 60 decreases through its absorption by the water flowing through first cylinder 60. Thus, after enough much water passes through first cylinder 60, a new or additional supply of crystal iodine will be required to be stored within first cylinder 60. By removing cap 70, access to the interior area of first cylinder 60 is provided for supplying the new or additional amount of crystal iodine 150. Preferably, a new o-ring 71, gasket, etc. can also be provided each time crystal iodine is added to first cylinder 60 and/or cap 70 is removed.

Though not preferred, it is also within the scope of the invention to permanently attach cap 70 to first cylinder 60 (or not have a cap but instead a permanent top) such that when it is time for a new supply of crystal iodine 150 the entire first cylinder 60/cap 70 is replaced with a new first cylinder 60/cap 70 having the fresh supply of crystal iodine 150 contained therein.

The higher position of the inlet port to the outlet port on first cylinder 60 causes the water entering into first cylinder 60 through the inlet portion to flow downward and contact a substantial portion of crystal iodine 150 prior to exiting out of the outlet port and into tubing 88 attached at a first end at the outlet port of first cylinder 60. Though not preferred, it is also within the scope of the invention to reverse the positions of the ports such that the water enters from the bottom of first cylinder 60 and flows upward to exit out of the outlet port of first cylinder 60.

A second cylinder, canister, receptacle, vessel, housing, container, etc. (collectively referred as "Cylinder 100") is provided with an inlet port having a tubing connection mechanism 102 provided towards the top of second cylinder 100 wherein a second end of tubing 88 is attached for receiving within second cylinder 100 the elemental iodine created within first cylinder 60. Second cylinder 100 is also provided with an outlet port having a tubing connection mechanism 104 provided towards the bottom of the second cylinder 100 for exiting the further stabilized elemental iodine out of second cylinder 100 (discussed in more detail below). Disposed within second cylinder 100 is a substantial amount of crystal iodine 150 which extends from at or near the bottom of second cylinder 100 up until the crystal iodine is at or near the top of second cylinder 100.

Second cylinder 100 can be provided with a removable cap 110 (i.e. threaded and screwed to second cylinder 100, snugly secured to second cylinder 100, etc.) which is sealed through an o-ring 111, gasket, etc. Removable cap 110 permits access to the interior area of second cylinder 100 for adding a fresh supply or additional crystal iodine 150. The amount of crystal iodine 150 contained within second cylinder 100 decreases through its absorption by the elemental iodine flowing into second cylinder 60 that was created within first cylinder 60. Thus, after enough elemental iodine passes through second cylinder 100, a new or additional supply of crystal iodine will be required to be stored within second cylinder 100. By removing cap 110, access to the interior area of second cylinder 100 is provided for supplying the new or additional amount of crystal iodine 150. Preferably, a new o-ring 111, gasket, etc. can also be provided each time crystal iodine is added to second cylinder 100 and/or cap 110 is removed.

The directing of the elemental iodine created in first cylinder 60 through second cylinder 100 increases the parts per million concentration of the elemental iodine and helps to stabilize or provide a consistent concentration for the elemental iodine created by system 10.

Though not preferred, it is also within the scope of the invention to permanently attach cap 110 to second cylinder 100 (or not have a cap but instead a permanent top) such that when it is time for a new supply of crystal iodine 150 the entire second cylinder 100/cap 110 is replaced with a new second cylinder 100/cap 110 having the fresh supply of crystal iodine 150 contained therein.

The higher position of the inlet port to the outlet port on second cylinder 100 causes the elemental iodine created in first cylinder 60 entering into second cylinder 100 through the inlet portion to flow downward and contact a substantial portion of crystal iodine 150 prior to exiting out of the outlet port. Though not preferred, it is also within the scope of the invention to reverse the positions of the ports such that the elemental iodine enters from the bottom of second cylinder 100 and flows upward to exit out of the outlet port of second cylinder 100.

First cylinder 60 can be constructed similar or the same as second cylinder 100 and for a system having more then two cylinders, all of the cylinders can be constructed similar or same. Additionally, systems having more then two cylinders can be connected in series communication with each similar to how the outlet of first cylinder 60 feeds into the input of second cylinder 100.

An outlet pipeline 120, tubing, etc. is in communication with second cylinder 100 through the second cylinder outlet port. A valve, such as a metering valve 92, is provided in outlet pipeline 120 for controlling the flow of elemental iodine flowing out of second cylinder 100. Where the system is provided with a single cylinder, the outlet pipeline 120 and metering valve 92 can be at the outlet of the single cylinder. Similarly, for a system having more then two cylinders, the outer pipeline 120 and metering valve 92 can be disposed at the outlet of the last cylinder of the plurality of cylinders.

Metering valve 92 helps to control how much parts per million of active elemental iodine will be in the water supply when the supply of iodinized water is introduced into water supply line 20 through reentry line 27 beyond valve 24. Metering valve 92 can be provided with a series of numbers with each number representing or corresponding to a certain amount of elemental iodine in parts per million. Thus, an operator merely turns a dial, indicator, etc. to the number corresponding to the desired amount of parts per million.

The further stabilized active elemental iodine leaves the outlet port of second cylinder 100 (or the last cylinder in a more than two cylinder system) and can be directed for reentry into water supply line 20 through reentry line 27. A valve 29 can be provided in reentry 27 to further control the flow of the iodinized water (elemental iodine). As an alternative to having the elemental iodine reenter water supply line 20, a hose or other connector can be attached at metering valve port 95. Thus, where the iodinized water (elemental iodine) is reentering water supply line 20, a first end of the elemental iodine (iodinized water) reentry line 27 can be connected at a metering valve port 95.

For other applications of the iodinized water (elemental iodine), a hose 103 with or without a sprayer 105, a dispenser, a tubing member, another water line, etc. can be connected to metering valve port 95. To switch the item to be connected to or at metering valve port 95, especially if water is still entering into first cylinder 60, metering valve 92 can be moved to a "closed" position, to prevent the iodinized water (elemental iodine) from continuing to flow through. With valve 92 in a closed position, the various items connectable to port 95 can be switched as desired. Once the desired item (elemental iodine reentry line 27, hose 103, sprayer, dispenser, etc.) is properly connected at port 95, valve 92 can be moved to an "open" position to permit the flow of the iodinized water (elemental iodine). When hose 103/sprayer 105 is connected at port 95, the flow of iodinized water (elemental iodine) flowing out of sprayer 105 can be controlled by an on/off valve 107. Additionally, where only reentry of the iodinized water (elemental iodine) into water supply line 20 is desired, the elemental iodine reentry line 27 can extend from the outlet port of second cylinder 100 (or last cylinder of a more than two cylinder system) to the water supply line 20 beyond valve 24. In this version a single valve can be provided to control elemental iodine flow and the connection of iodinized water reentry line 27 can be permanent (though such is not considered limiting).

In use valve 24 is turned such that water following through from water supply 20 into high 22 creates a backflow to direct a certain amount of water through opening 26 into tubing 28 and into cylinder 60. The water going into cylinder 60 is exposed to and reacts with the crystal iodine and creates elemental iodine therefrom the exposure and reaction. The elemental iodine then leaves cylinder 60 and travels through tubing 88 until it reaches second cylinder 100. The elemental iodinized water going into cylinder 100 is exposed to and reacts with the crystal iodine to further stabilize the active elemental iodine. The elemental iodine then leaves cylinder 100 and travels through iodinized water reentry line 27 back into the water supply, through hosing 103, or as otherwise desired.

Where the iodinized water is fed back into the water supply line 20, it can be mixed with water passing through valve 24 so that the potency or concentration of the elemental iodine is diluted. The reduced potency iodine can be effective in treating and killing many diseases known to exist in water supply lines and as fluid source to farm animals can be used as a treatment of diseases found in such animals, such as, but not limited to, salmonella. Attaching hose 103 or another attachment provides the elemental iodinized water in a more potent form as it is available for its desired application without being mixed with regular water flowing through water supply line 20. One non-limiting use for the elemental iodine applied from hose 103 can be for cleaning purposes such as, but not limited to, spraying an area occupied by pigs to kill "*e coli*" bacteria living in the area.

Though not show a two or more connection port can be provided for the metering valve port 95. Where a two port connection is provided (i.e. "Y" fitting, etc.), both the elemental iodine (iodinized water) reentry line 27 and hose 103 can be connected at port 95, and a controller can be provided to select which elemental iodine travel route to open. The controller could also be set up to permit both routes to be open at the same time.

Though elemental iodine can be created from a single cylinder system and such system is considered within the scope of the invention, it is preferred, though again not absolutely required, that at least second cylinder 100 with its second amount of crystal iodine be provided in order to produce a more stable and consistent elemental iodine. Furthermore, as mentioned above, it is also within the scope of the invention that more than two cylinders containing crystal iodine can be provided and preferably in series similar to how the first and second cylinders described above are attached.

It should be recognized that the various water routes can be created through pipes (metal, PVC, plastic, stainless steel, etc.), tubing, hoses, etc. and such terminology can be considered interchangeable with respect to the above description and claims. Furthermore, a water travel route can be created by any possible configuration (i.e. one long pipe, fittings, short pipes, tubing, hoses, with connectors such as elbows, "forty five" connectors, "T" or "Y" shape connectors, etc.) and all are considered with the scope of the invention. Furthermore, the present invention is not considered to any one type of valve and all valves capable of controlling and directing water and elemental iodine flow as described above can be used and are considered within the scope of the invention. The various valves, fittings, pipes, connectors, housings (cylinders), etc. describe above can be preferably sealably connected within the pipelines and water travel routes through conventional plumbing techniques and all such techniques and components needed therefore (i.e. gaskets, o-rings, welding materials, etc.) are considered within the present invention and are incorporated by reference. Additionally, though the invention is intended to be use with a water supply line, it is also considered within the scope of the invention to pass through other types of fluids in addition or alternatively to water.

System 10 can be supported in position by any frame or support system. In one non-limiting example, brackets 131, braces, straps, etc. can be used to secure system 10 to a wall, structure, platform, etc. Additionally, the connection of system 10 within a water supply line may be itself, provide enough support for system 10.

While the invention has been described and disclosed in certain terms and has disclosed certain embodiments or modifications, person skilled in the art who have acquainted themselves with the invention, will appreciate that it is not necessarily limited by such terms, nor to the specific embodiments and modifications disclosed herein. Thus, a wide variety of alternatives, suggested by the teachings herein, can be practiced without departing from the spirit of the invention, and rights to such alternatives are particularly reserved and considered within the scope of the invention.

What is claimed is:

1. A method for creating active elemental iodine, said method comprising the steps of:
    (a) directing a fluid into a top portion of a first housing having a first amount of crystal iodine stored within the first housing such that the fluid contacts at least some of the first amount of crystal iodine to create active elemental iodine;
    (b) directing the fluid containing the active elemental iodine out of a bottom portion of the first housing;
    (c) directing the fluid containing the active elemental iodine into a top portion of a second housing having a second amount of crystal iodine stored within the second housing such that the fluid containing the active elemental iodine contacts at least some of the second amount of crystal iodine; and
    (d) directing the fluid containing the active elemental iodine out of a bottom portion of the second housing.

2. The method of claim 1 further comprising the step of directing the fluid containing the active elemental iodine into a water supply line.

3. The method of claim 1 further comprising the step of directing the fluid containing the active elemental iodine exiting out of the bottom portion of the second housing directly to a fluid dispenser without first directing the fluid containing the active elemental iodine back into a main water supply line.

4. The method of claim 1 wherein fluid is directed to the first housing in step (a) by creating back pressure in a main water supply line by turning a valve provided in the main water supply line between a first point on the main water supply line where the fluid leaves the main water supply line and a second point on the main water supply line where the fluid containing the active elemental iodine is introduced back into the main water supply line.

5. The method of claim 1 wherein fluid is directed to the first housing in step (a) by creating back pressure in a main water supply through the partial closing of a valve in the main water supply line.

6. The method of claim 1 wherein said fluid is diverted from a main water supply line directly to the top portion of the first housing.

7. A method for creating active elemental iodine, said method comprising the steps of:
    (a) directing a fluid into a top portion of a first housing having a first amount of crystal iodine stored within the first housing such that the fluid contacts at least some of the first amount of crystal iodine to create active elemental iodine;
    (b) directing the fluid containing the active elemental iodine out of a bottom portion of the first housing;
    (c) directing the fluid containing the active elemental iodine into a top portion of a second housing having a second amount of crystal iodine stored within the second housing such that the fluid containing the active elemental iodine contacts at least some of the second amount of crystal iodine;
    (d) directing the fluid containing the active elemental iodine out of a bottom portion of the second housing; and
    (e) directing the fluid containing the active elemental iodine into a water supply line.

8. The method of claim 7 wherein fluid is directed to the first housing in step (a) by creating back pressure in a main water supply line by turning a valve provided in the main water supply line between a first point on the main water supply line where the fluid leaves the main water supply line and a second point on the main water supply line where the fluid containing the active elemental iodine is introduced back into the main water supply line.

9. The method of claim 7 wherein fluid is directed to the first housing in step (a) by creating back pressure in a main water supply through the partial closing of a valve in the main water supply line.

10. The method of claim 7 wherein said fluid is diverted from a main water supply line directly to the top portion of the first housing.

11. A method for creating active elemental iodine, said method comprising the steps of:
    (a) directing a fluid into a top portion of a first housing having a first amount of crystal iodine stored within the first housing such that the fluid contacts at least some of the first amount of crystal iodine to create active elemental iodine;
    (b) directing the fluid containing the active elemental iodine out of a bottom portion of the first housing;
    (c) directing the fluid containing the active elemental iodine into a top portion of a second housing having a second amount of crystal iodine stored within the second housing such that the fluid containing the active elemental iodine contacts at least some of the second amount of crystal iodine;
    (d) directing the fluid containing the active elemental iodine out of a bottom portion of the second housing; and
    (e) directing the fluid containing the active elemental iodine exiting out of the bottom portion of the second housing directly to a fluid dispenser without first directing the fluid containing the active elemental iodine back into a main water supply line.

12. The method of claim 11 wherein fluid is directed to the first housing in step (a) by creating back pressure in a main water supply line by turning a valve provided in the main water supply line between a first point on the main water supply line where the fluid leaves the main water supply line and a second point on the main water supply line where the fluid containing the active elemental iodine is introduced back into the main water supply line.

13. The method of claim 11 wherein fluid is directed to the first housing in step (a) by creating back pressure in a main water supply through the partial closing of a valve in the main water supply line.

14. The method of claim 11 wherein said fluid is diverted from a main water supply line directly to the top portion of the first housing.

* * * * *